United States Patent
Chang et al.

(10) Patent No.: US 11,360,527 B2
(45) Date of Patent: Jun. 14, 2022

(54) LOW HEIGHT PCIE RISER BRACKET FOR COMPUTING DEVICE

(71) Applicant: Quanta Computer Inc., Taoyuan (TW)

(72) Inventors: Chun Chang, Taoyuan (TW);
Zhao-Hong Chen, Taoyuan (TW);
Yi-Huang Chiu, Taoyuan (TW);
Shih-Ming Lo, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/998,521

(22) Filed: Aug. 20, 2020

(65) Prior Publication Data

US 2021/0365084 A1    Nov. 25, 2021

Related U.S. Application Data

(60) Provisional application No. 63/028,068, filed on May 21, 2020.

(51) Int. Cl.
*G06F 1/18* (2006.01)
*G06F 13/40* (2006.01)
*G06F 13/42* (2006.01)

(52) U.S. Cl.
CPC .......... *G06F 1/185* (2013.01); *G06F 13/4004* (2013.01); *G06F 13/4282* (2013.01); *G06F 2213/0026* (2013.01)

(58) Field of Classification Search
CPC ....................................................... G06F 1/185
See application file for complete search history.

(56) References Cited

U.S. PATENT DOCUMENTS

| | | | | |
|---|---|---|---|---|
| 5,594,621 A | * | 1/1997 | van Rumpt | G06F 1/184 361/679.32 |
| 6,731,515 B2 | * | 5/2004 | Rhoads | H05K 1/14 361/785 |
| 7,359,216 B2 | * | 4/2008 | Hall | G06F 1/185 361/679.55 |

* cited by examiner

*Primary Examiner* — Henry Tsai
*Assistant Examiner* — Juanito Borromeo
(74) *Attorney, Agent, or Firm* — Nixon Peabody LLP (57) ABSTRACT

A compact expansion card riser assembly for connection of two expansion cards to horizontally oriented circuit board is disclosed. The riser assembly includes a support bracket, a first horizontal riser board, and a second horizontal riser board. The first horizontal riser board has an expansion card connector. The first horizontal riser is attached to the support bracket. The support bracket and first horizontal riser board support a horizontally oriented expansion card. The second horizontal riser board has an expansion card connector. The second horizontal riser is attached to the support bracket. The support bracket and second horizontal riser board support a horizontally oriented expansion card.

19 Claims, 10 Drawing Sheets

LOW HEIGHT PCIE RISER BRACKET FOR COMPUTING DEVICE

CROSS-REFERENCE TO RELATED APPLICATIONS

This patent application claims the benefit of U.S. Provisional Patent Application No. 63/028,068, filed May 21, 2020. The contents of that application in its entirety are hereby incorporated by reference.

TECHNICAL FIELD

The present disclosure relates generally to systems and methods for supporting expansion cards in a computing device. More particularly, aspects of this disclosure relate to a compact removable bracket assembly for the installation of dual PCIe cards in a computing device.

BACKGROUND

Computer servers are computer devices generally designed for certain specialized functions. Servers generally include common components such as processors, memory, a cooling system, and a power system. Generally, servers have a chassis that has walls of a certain height that may be standardized for insertion of the chassis in racks in a data center. The chassis generally holds a motherboard with the basic components such as the processors, dual in line memories (DIMMs), storage devices, fans and power supplies. Servers can be specially designed to enhance performance of certain functions. For example, an application server may have relatively more processors for processing applications or a storage server may have more storage devices for more storage capability. However, it is often desirable to expand the functions of the server though additional components, such as network interface cards, memories, or processors.

Various protocols allow a user the flexibility of adding or enhancing functions in a computer system through additional hardware expansion cards. Such expansion cards are essentially smaller circuit boards that may be inserted in the server chassis, and include functional components that may be electrically connected to the other server components. One well-known standard for communication between server components is the peripheral component interconnect express (PCIe) standard. Thus, a server will often include PCIe connectors and corresponding cables that allow the connection to PCIe compliant expansion cards to expand the functionality of the server. A server chassis generally has a horizontally oriented motherboard at the bottom of the chassis. Expansion cards can be inserted in slots perpendicularly to the motherboard, but the vertical placement of such expansion cards limits the size of the card based on the height of the chassis.

To allow for the use of larger expansion cards, a riser assembly is used to mount the expansion card. Typically, a riser assembly will include a support bracket and a vertically oriented riser board. The riser board will have a perpendicular PCIe connector. Thus, when the PCIe compliant card is attached to the connector, it is supported in a horizontal position, and in parallel, with the motherboard. Connections to cable ribbons may be made on slimline connectors on the vertical riser board to allow for communication between the card and the motherboard. This arrangement allows larger PCIe cards to be used with a server.

Figure 1A:
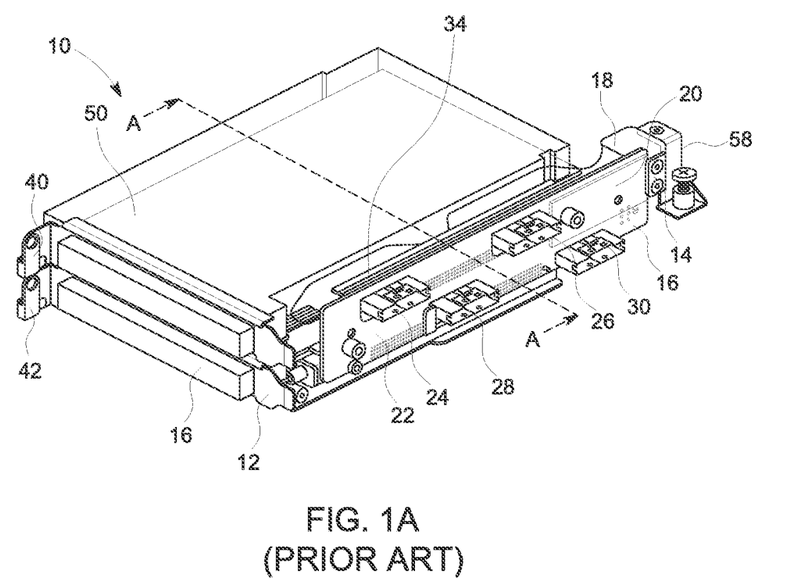
FIG. 1A is a perspective view of a prior art expansion card riser assembly.
Figure 1B:
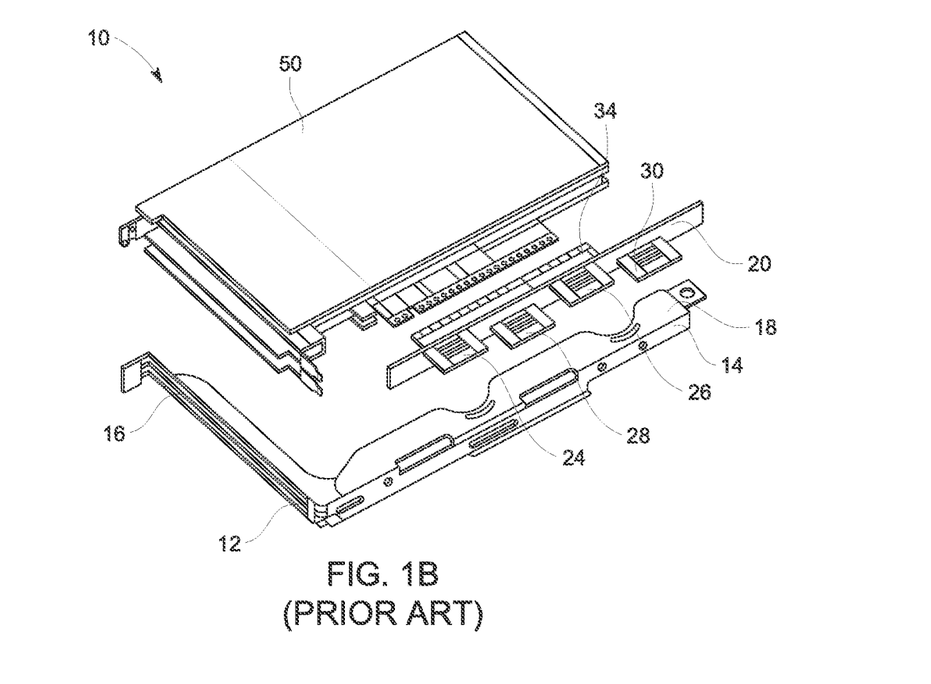
FIG. 1B is an exploded perspective view of the prior art expansion card riser assembly in FIG. 1A.
Figure 1C:
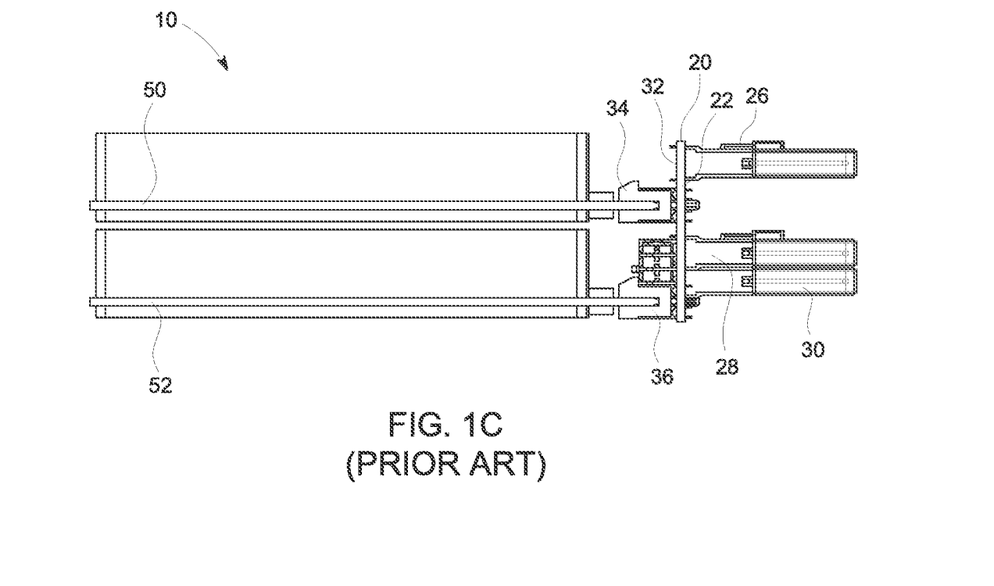
FIG. 1C is a side view of the prior art expansion card riser assembly in FIG. 1A.
Figure 1D:
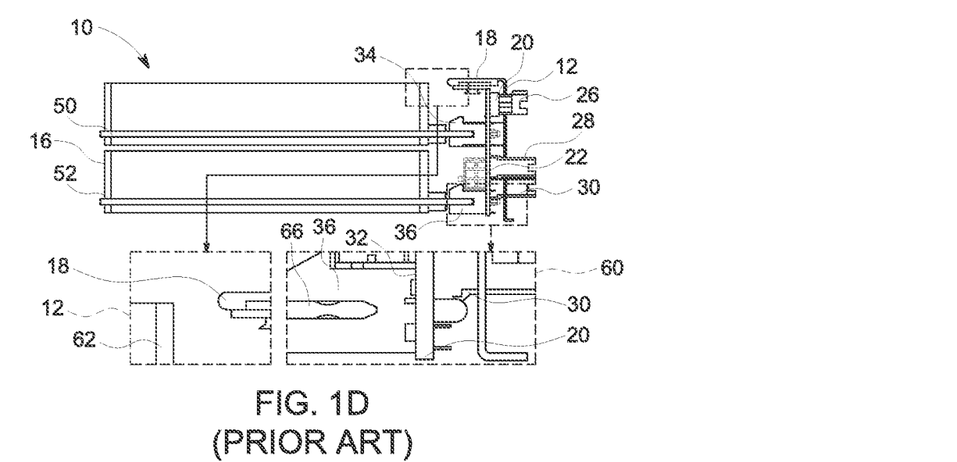
FIG. 1D is a side view of the prior art expansion card riser assembly in FIG. 1A showing the installation of the bracket.
Figure 1E:
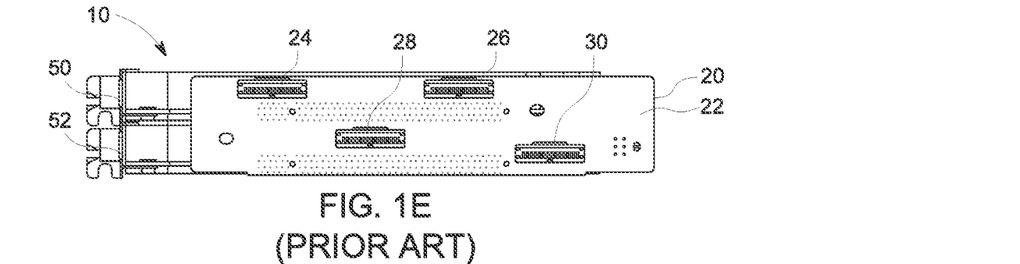
FIG. 1E is a side view of the connectors of the prior art expansion card riser assembly in FIG. 1A.
Figure 1F:
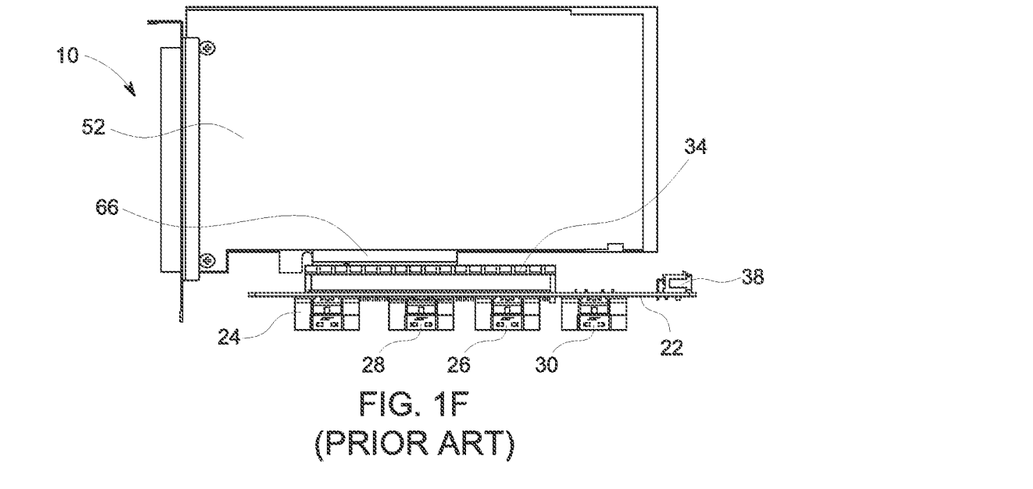
FIG. 1F is a top view of the prior art expansion card riser assembly in FIG. 1A.

FIGS. 1A-1F show an example prior art riser assembly 10 that allows two PCIe expansion cards to be attached to a motherboard in a horizontal orientation. FIG. 1A is a perspective view of the prior art PCIe riser assembly 10 that includes a support bracket 12, and a vertical riser board 20. FIG. 1B is an exploded perspective view of the components of the prior art PCIe riser assembly 10. FIG. 1C is a cutaway side view of the prior art PCIe riser assembly 10 along the line A-A' in FIG. 1A, showing the vertical riser board 20 with the bracket removed. FIG. 1D is a cutaway side view of the prior art PCIe riser assembly 10 along the line A-A' in FIG. 1A with the bracket 12 shown supporting the vertical riser board 20. FIG. 1E is a side view of the connectors of the prior art expansion card riser assembly 10. FIG. 1F is a top view of the prior art expansion card riser assembly 10.

In FIGS. 1A-1B, the riser assembly 10 includes a support bracket 12 that includes a vertical metal plate 14 to enclose the PCIe cards. The metal plate 14 is attached to a perpendicular component frame 16. The metal plate 14 includes a perpendicularly oriented overhanging plate 18 that extends out from the plate 14. The metal plate 14 holds a vertical riser board 20 in a vertical position relative to the motherboard. The vertical riser board 20 includes an outer surface 22 that includes slimline connectors 24 and 26, and slimline connectors 28 and 30. In FIG. 1B, an inner surface 32 includes two PCIe connector sockets 34 and 36 that extend from the surface 32 of the board 20. The connector sockets 34 and 36 are DIP type connectors. A buffer distance between the connector socket 36 and the bottom edge of the vertical riser board 20 (attached to the motherboard) must be established to prevent damage to the connector 36 contacting the motherboard. As shown in FIG. 1D, the riser board 20 also includes a power socket 38 on the surface 32. The power socket 38 and slimline connectors 24, 26, 28, and 30 are used to connect power and data signals from the motherboard to the cards 50 and 52. A bracket structure 58 (in FIG. 1A) allows the attachment of the riser assembly 10 to the motherboard.

As shown in FIG. 1C, the PCIe connector sockets 34 and 36 on the vertical riser board 20 may be mated with edge connectors on the corresponding PCIe cards 50 and 52. As shown in FIG. 1A, the component frame 16 includes two locking levers 40 and 42 that may be rotated to lock the opposite side of the two PCIe cards 50 and 52 from the riser board 20. As shown in an inset 60 in FIG. 1D, the sockets on the riser board 20 such as the socket 36 are DIP type connectors that accept an edge 66 of the PCIe card 52 having golden finger connectors. As explained above, the edge 66 is inserted to the end of the slot of the connector 36. In this example, the connector 36 must be at least 1 mm from the surface of the motherboard.

As shown in an inset 62 in FIG. 1D, the overhanging bracket 18 overlaps the top of the riser board 20. The overhanging bracket 18 is therefore higher than the support structure 12, and therefore adds to the height to the assembly 10.

The height of conventional vertical riser boards in known riser assemblies may create spacing issues when two PCIe cards are stacked in a full height configuration. For example, a compact server chassis may have a height of 42.5 mm, while a riser board for two PCIe cards, such as the riser assembly 10, has a 41.4 mm height. The riser board assembly with dual PCIe cards when installed on the motherboard must be at least 1 mm less than the chassis height of 42.5 to account for Mylar sheets on the top and bottom of the assembly. Thus, the conventional vertical riser board assembly 10 cannot be used because the height of the installed riser assembly 10 exceeds the height of the compact chassis.

Thus, there is a need for a dual card riser assembly that may be deployed in compact chassis structures. There is a further need to set cable routing to a riser board for an expansion card in such a manner that the module width is reduced efficiently. There is another need for a providing a more compact riser assembly to save space in different dimensions. There is a further need to reduce the buffer distance from the connector housing to the riser board edge.

SUMMARY

One disclosed example is a compact expansion card riser assembly for connection of two expansion cards to a horizontally oriented circuit board. The assembly includes a support bracket attachable to the circuit board. A first horizontal riser board with an expansion card connector is provided. The first horizontal riser is attached to the support bracket. The support bracket and the first horizontal riser board support a horizontally oriented expansion card. A second horizontal riser board with an expansion card connector is provided. The second horizontal riser is attached to the support bracket. The support bracket and the second horizontal riser board support a horizontally oriented expansion card.

A further implementation of the example riser assembly is an embodiment where the expansion cards are PCIe cards. Another implementation is where the first horizontal riser board includes an external connector for electrical connection to the circuit board. Another implementation is where the first horizontal riser board includes a connection portion mounting the expansion card connector and an external connection portion in perpendicular orientation to the connection portion. Another implementation is where an external connector including one of a slimline connector and a power connector, is mounted on an external edge of the external connection portion. Another implementation is where the expansion card connectors are straddle mount connectors. Another implementation is where the support bracket includes a bottom flap and a top flap. Another implementation is where the top flap is attachable to the first riser board, and where the bottom flap is attachable to the second riser board. Another implementation is where the bottom flap includes an aperture for mating with a pin on the circuit board, and includes a support bracket for attaching to a bracket on the circuit board. Another implementation is where the support bracket includes a front frame with apertures to access expansion cards connected to the riser boards, and a rear frame with apertures to access the riser boards. Another implementation is where the first horizontal riser board has an inner edge with the expansion card connector and an opposite outer edge having an external connector.

Another disclosed example is a computing system having a chassis and a horizontally oriented circuit board installed on the chassis. The circuit board includes cables for connection to PCIe expansion cards. The system has an expansion card riser assembly attached to the circuit board. The riser assembly includes a support bracket. The riser assembly includes a first horizontal riser board with an expansion card connector. The first horizontal riser is attached to the support bracket. The support bracket and the first horizontal riser board support a horizontally oriented PCIe expansion card. The assembly has a second horizontal riser board with an expansion card connector. The second horizontal riser is attached to the support bracket. The support bracket and the second horizontal riser board support a horizontally oriented PCIe expansion card.

A further implementation of the example system is an embodiment where the first horizontal riser board includes an external connector for electrical connection to the circuit board. Another implementation is where the first horizontal riser board includes a connection portion mounting the expansion card connector and an external connection portion in perpendicular orientation to the connection portion. Another implementation is where an external connector including one of a slimline connector and a power connector, is mounted on an external edge of the external connection portion. Another implementation is where the expansion card connectors are straddle mount connectors. Another implementation is where the support bracket includes a bottom flap and a top flap. The top flap is attachable to the first riser board, and the bottom flap is attachable to the second riser board. Another implementation is where the bottom flap includes an aperture for mating with a pin on the circuit board, and includes a support bracket for attaching to a bracket on the circuit board. Another implementation is where the support bracket includes a front frame with apertures to access expansion cards connected to the riser boards, and a rear frame with apertures to access the riser boards. Another implementation is where the first horizontal riser board has an inner edge with the expansion card connector and an opposite outer edge having an external connector.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of embodiments together with reference to the accompanying drawings.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure relates to card riser assembly that includes horizontal riser boards for mating with expansion cards such as PCIe expansion cards. The example assembly therefore has a reduced height, thereby allowing for deployment in a standard server height with two expansion cards. The example horizontal riser boards also arrange the slimline and power connectors in an efficient location to allow for a smaller riser board footprint and therefore increase available space in a chassis.

Figure 2A:
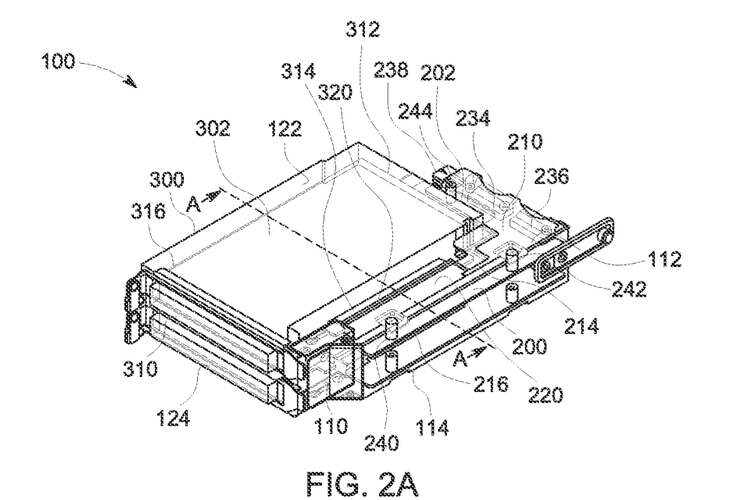
FIG. 2A is a front perspective view of an example compact expansion card riser assembly.
Figure 2B:
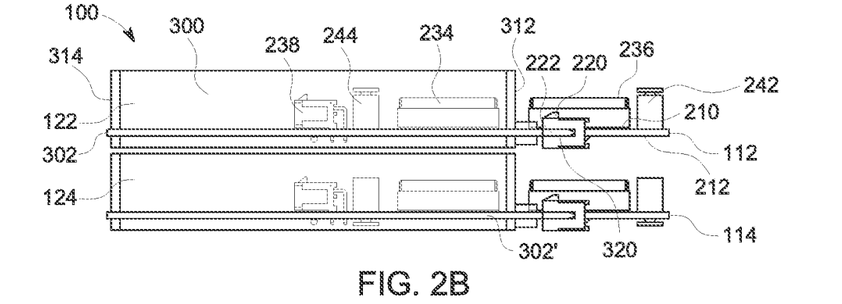
FIG. 2B is a cutaway view of the example compact expansion card riser assembly in FIG. 2A.
Figure 2C:
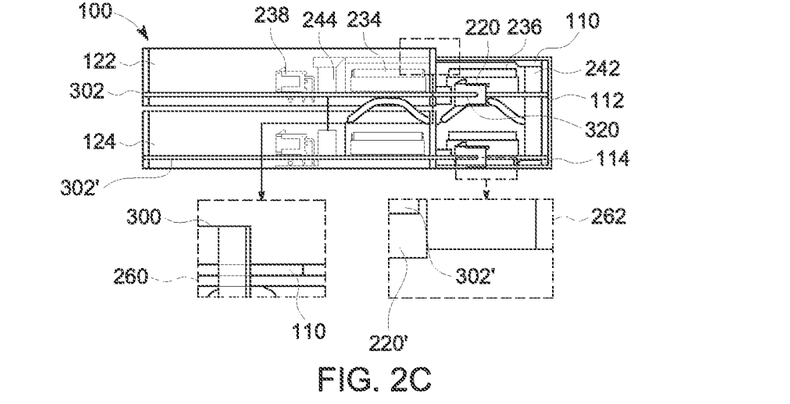
FIG. 2C is a cutaway view of the example compact expansion card riser assembly in FIG. 2A with the bracket component attached.
Figure 3A:
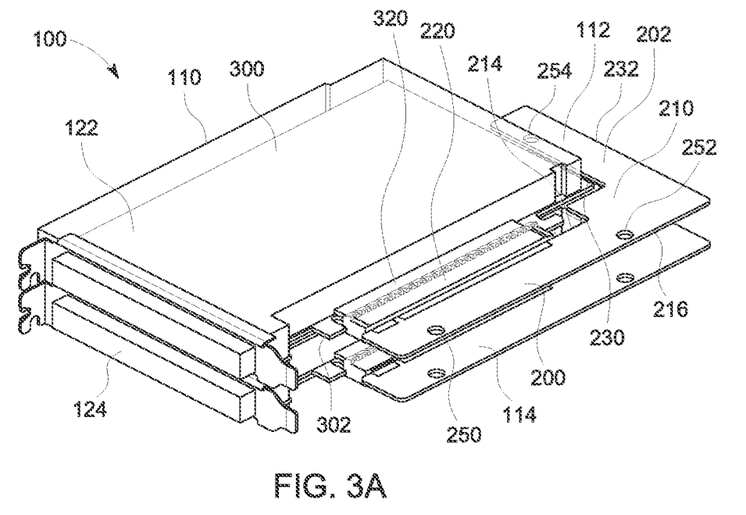
FIG. 3A is a perspective partially exploded view of the components of the example compact expansion card riser assembly in FIG. 2A.
Figure 3B:
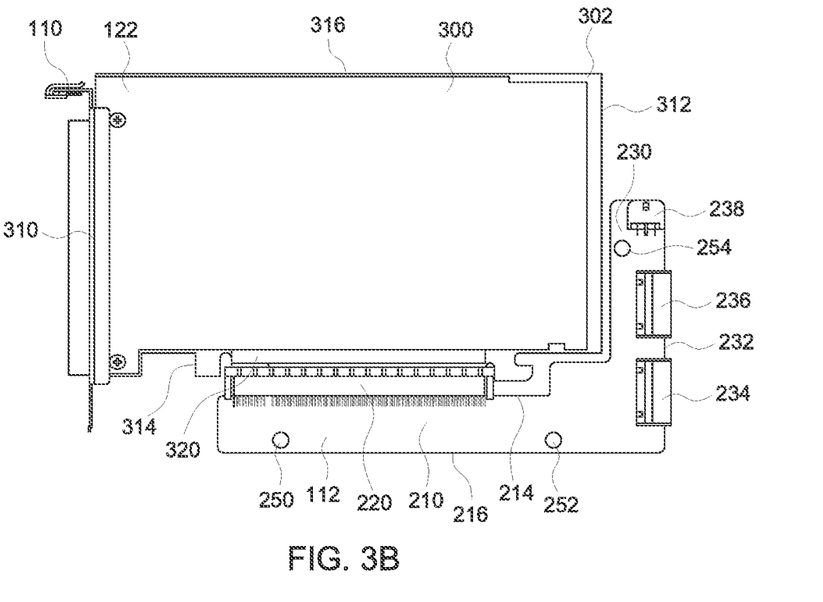
FIG. 3B is a top view of the example components of the example compact expansion card riser assembly in FIG. 3A.
Figure 3C:
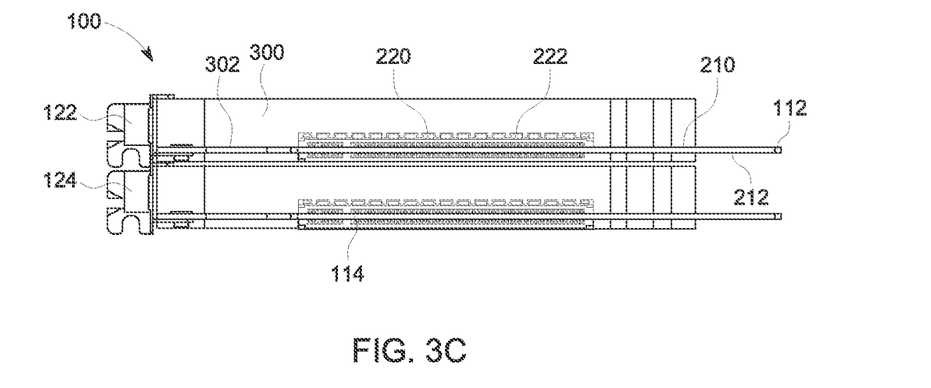
FIG. 3C is a side view of the example components of the expansion card riser assembly in FIG. 3A.

FIG. 2A is a front perspective view of an example compact PCIe riser assembly 100 for supporting dual expansion cards. The example compact PCIe riser assembly 100 has a reduced height based on deployment of horizontal riser boards. FIG. 2B is a cutaway view of the example compact PCIe riser assembly 100 along the line A-A' in FIG. 2A. FIG. 2C is a cutaway view of the example compact PCIe riser assembly 100 along the line A-A' in FIG. 2A with a bracket component attached. FIG. 3A is a perspective partially exploded view of the components of the example compact riser assembly 100 in FIG. 2A with certain components removed from the riser horizontal riser boards. FIG. 3B is a top view of the example components of the example compact riser assembly 100. FIG. 3C is a side view of the example components of the compact riser assembly 100.

The riser assembly 100 includes a support bracket component 110 (shown in shadow in FIG. 2A), a first horizontal riser board 112, and a second horizontal riser board 114. Two expansion cards 122 and 124 are connected to the respective first horizontal riser board 112 and the second horizontal riser board 114. In this example, the expansion cards 122 and 124 are PCIe cards.

The example horizontal riser board 112 has an L shape including an attachment portion 200 and an external connection portion 202. The external connection portion 202 is roughly perpendicular to the attachment portion 200. The attachment portion 200 and the external connection portion 202 define a top surface 210 and an opposite bottom surface 212. The attachment portion 200 has an inner edge 214 and an opposite outer edge 216. The inner edge 214 supports a straddle mount type PCIe card connector 220. The straddle mount type PCIe card connector 220 contacts both surfaces 210 and 212 (in FIG. 2B) of the riser board 112 and thus sandwiches the board 112. The PCIe card connector 220 includes a connector slot 222 that receives an edge connector of a PCIe card.

As shown in FIG. 3B, the external connection portion 202 includes an inner edge 230 and an opposite outer edge 232. Two slimline connectors 234 and 236 are mounted on the top surface 210 in proximity to the outer edge 232. The slimline connectors 234 and 236 are connected to groups of ribbon cables from the motherboard to allow an attached expansion card to exchange data signals with the motherboard. A power connector 238 is mounted on the distal end of the external connection portion 202. A power cable may be inserted into the power connector 238 to provide power through the horizontal riser board 112 to any attached expansion card. The top surface 210 includes support posts 240, 242, and 244 that may be in contact with another board.

As shown in FIG. 3A-3B, three holes 250, 252, and 254 are formed on the attachment portion 200 and the connection portion 202. The support posts 240, 242, and 244 in FIG. 2A are inserted in the holes 250, 252, and 254 respectively when the riser board 112 is assembled. In this example, the posts 240, 242, and 244 have an open end that may accept a SMT nut that is inserted through the respective holes 250, 252, and 254 to secure the respective posts. However, other suitable attachment mechanisms may be used.

As shown in FIG. 2A, FIG. 3A, and FIG. 3B, an example expansion card, such as the PCIe type expansion card 122, includes a rectangular housing 300. The housing 300 covers a circuit board 302. The circuit board 302 includes opposite front and rear sides 310 and 312. The front and rear sides 310 and 312 are joined by a proximal side 314 and a distal side 316. The proximal side 314 includes a connector edge 320 that extends out from the circuit board 302. The connector edge 320 may include golden finger connectors that may be inserted in any suitable connector such as a straddle mount connector or a DIP type connector. The circuit board 302 includes different components that may receive power and exchange data through the connector edge 320 when inserted in the card connector 220 of the riser board 112, as shown in FIG. 2A.

Figure 4:
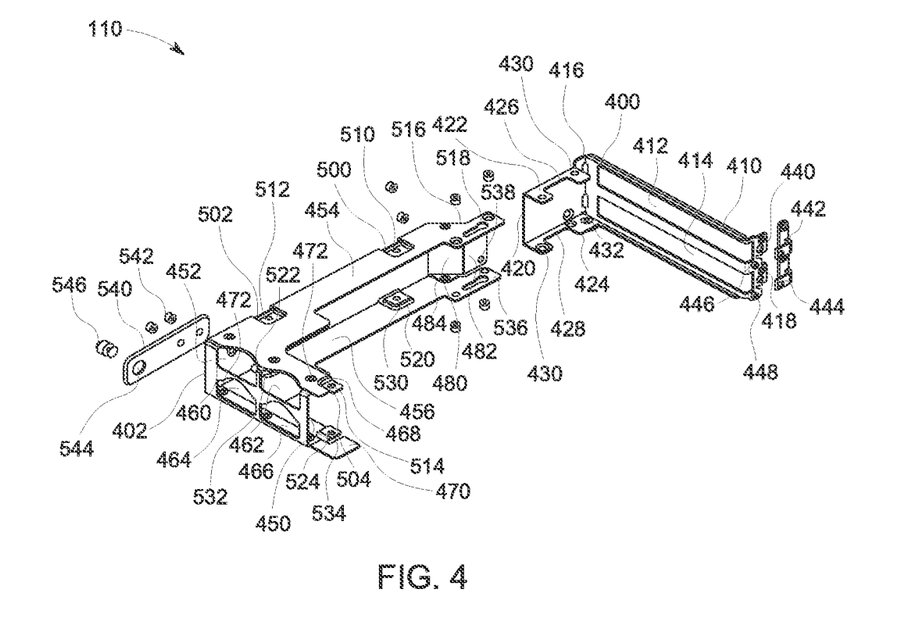
FIG. 4 is a partially exploded view of the components of the support bracket of the expansion card riser assembly in FIG. 2A.

FIG. 4 is a partially exploded view of the components of the support bracket 110 of the riser assembly 100 in FIG. 2A. The support bracket 110 includes a front piece 400 and a rear piece 402. The front piece 400 includes a frame member 410 that includes apertures 412 and 414 running along the length of the frame member 410. The apertures 412 and 414 allow access to the PCIe cards 122 and 124 in FIGS. 2A and 3A when installed on the support bracket 110. The frame member 410 includes opposite edges 416 and 418. The edge 416 is connected to a partial side wall 420. The side wall 420 includes a top flap 422 and a bottom flap 424. Each of the flaps 422 and 424 includes a respective cutout 426 and 428 that define extending arms with rivet holes 430. In this example, the frame member 410 is fabricated as a separate piece and is attached to the partial side wall 420 via a rivet 432 on the bottom flap 424.

The edge 418 includes a support tab 440 that extends perpendicularly from the frame 410. The support tab 440 includes two rotating locking latches 442 and 444 on respective pins 446 and 448. The latches 442 and 444 and the respective pins 446 and 448 are mounted in holes in the support tab 440. The locking latches 442 and 444 have an unlocked position rotated away from the support tab 440 and a locked position rotated to engage a respective installed expansion card to lock the card to the support bracket 110.

The rear piece 402 includes a rear frame 450 that is perpendicular to a side panel 452. The side panel 452 includes a top flap 454 and a bottom flap 456 at roughly perpendicular orientation to the plane of the side panel 452. In this example, the rear frame 450 and side panel 452 form a single component that is joined together with the top flap 454 and the bottom flap 456 by fasteners such as rivets.

The rear frame 450 includes rectangular apertures 460, 462, 464, and 466 that allow access to slimline connectors, such as the slimline connectors 234 and 236 of the riser board 112 in FIG. 3A. The rear frame 450 includes a top flap 468 and a bottom flap 470. The top flap 468 and the bottom flap 470 are joined via rivets 472 to one end of the top flap 454 and one end of the bottom flap 456 respectively.

The opposite end of the side panel 452 includes a slanted panel 480 that is joined to an end flap 482. The slanted panel 480 supports a triangular tab 484 that is perpendicularly joined to the slanted panel 480. The triangular tab 484 allows attachment to the bottom flap 456 via a rivet.

The top flap 454 includes two indented tab areas 500 and 502. Another indented tab area 504 is defined on the top flap 468 of the rear frame 450. The tab areas 500, 502, and 504 are provided with corresponding through holes 510, 512, and 514. The through holes 510, 512, and 514 allow the insertion of screws to secure corresponding posts of a riser board, such as the riser board 112 in FIG. 3A. The top flap 454 also includes an end section 516 that has a keyhole shaped aperture 518. The end section 516 is joined to the arms of the flap 422 of the front piece 400. The cutout 426 allows access to the aperture 518 when the front piece 400 is attached to the rear piece 402.

The bottom flap 456 includes two indented tab areas 520 and 522. Another indented tab area 524 is defined on the bottom flap 470 of the rear frame 450. The indented tab areas 520, 522, and 524 are provided with corresponding through holes 530, 532, and 534. The through holes 530, 532, and 534 allow the insertion of screws to secure corresponding holes in a riser board such as the riser board 114 in FIG. 3A. The bottom flap 456 also includes an end section 536 that has a keyhole shaped aperture 538. The end section 536 is joined to the arms of the bottom flap 424 of the front piece 400. The cutout 428 allows access to the aperture 538 when the front piece 400 is attached to the rear piece 402.

A mounting bracket 540 has a distal end that is attached by rivets 542 to one end of the side panel 452. The proximal end of the mounting bracket 540 includes a hole 544 that supports an auto lock plunger 546. The auto lock plunger 546 may have an open and closed position for a plunger to attach the mounting bracket 540 to fixtures on a motherboard when the riser assembly 100 is mounted on the motherboard.

The resulting assembly 100 in FIGS. 2A-2C and 3A-3B provides several advantages in reducing dimensions of the support bracket 110 and riser boards 112 and 114, thereby allowing increased space in a server chassis. An inset 260 in FIG. 2C shows the reduction in bracket height through the employment of the horizontal riser boards 112 and 114. As shown in FIG. 2C, the height of the support bracket 110 is less than the height of the housing 300 of the upper PCIe card 122. This allows the riser assembly 100 to fit in a compact chassis. Another inset 262 shows that the use of a straddle mount connector 220' (identical to the connector 220 on riser board 112) on the riser board 114 allows for a much smaller gap of 0.08 mm from a motherboard 302' of the card 124 to the connector 220', as defined by the bottom of the support bracket 110. The smaller gap allows for a more compact height of the assembly and thus allows the use with a compact chassis. Since additional space is created by the connector arrangement, larger connectors may be used.

Finally, the location of the slimline connectors 234 and 236, and power connector 238, on the external connection portion 202 of the horizontal riser board 112 as shown in FIG. 3B, allows a smaller width of the assembly 100 as compared to the known assemblies as shown in FIG. 1E, where the external connectors are opposite the PCIe card connector 220. Thus, the overall footprint the assembly 100 in the planar area as well as height is relatively less than conventional dual card riser assemblies.

Figure 5A:
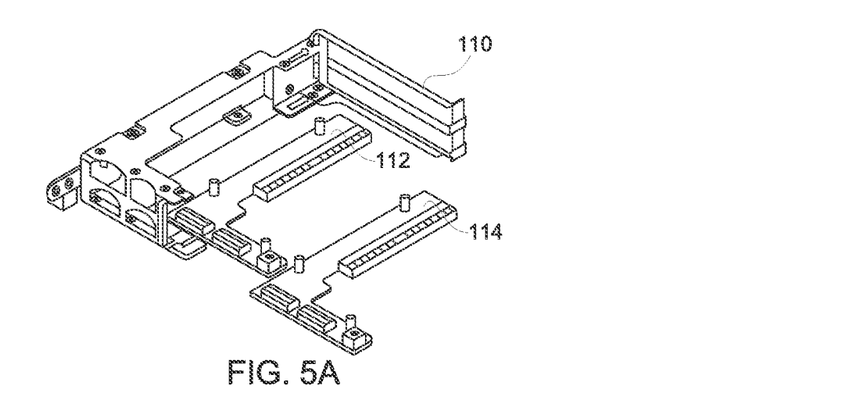
FIGS. 5A-5F show the different stages of assembling and installing the example expansion card riser assembly in FIG. 2A to a computing device.
Figure 5B:
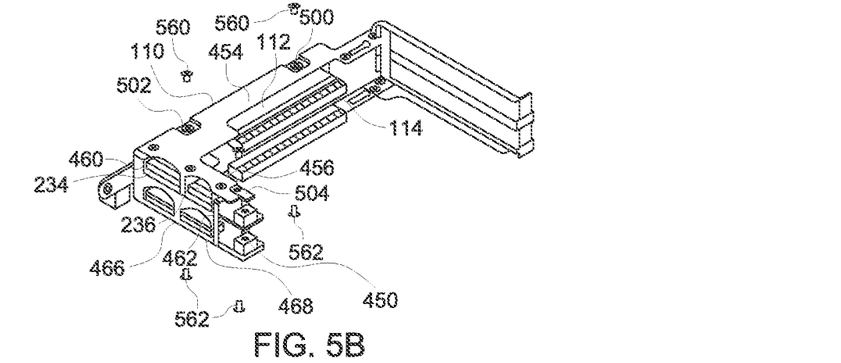

FIGS. 5A-5F show the different stages of assembling and installing the example riser assembly 100 in FIG. 2A. Like elements in FIGS. 5A-5F have like reference numbers to their counterparts in FIGS. 2-4. FIG. 5A shows the support bracket 110 and the riser boards 112 and 114 prior to assembly. As shown in FIG. 5B, the riser board 112 is placed in alignment with the top flap 454 of the support bracket 110, such that the support posts 240, 242, and 244 (shown in FIG. 2A) are in alignment with the through holes 510, 512, and 514 (shown in FIG. 4) in the corresponding tab indentation areas 500, 502, and 504. The slimline connectors 234 and 236 are aligned with the apertures 460 and 462 in the rear frame 450. Screws 560 are provided to attach the posts 240, 242, and 244 of the riser board 112 to the top flap 454 and top flap 468 through the holes 510, 512, and 514.

Figure 5C:
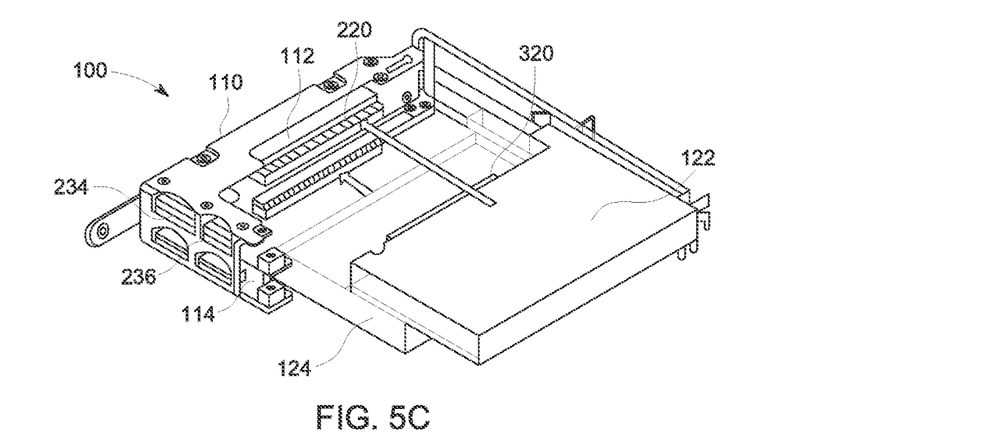

Similarly, FIGS. 5A-5C show that the riser board 114 is placed in alignment with the bottom flap 456 of the support bracket 110 such that the through holes similar to the through holes 250, 252, and 254 in the riser board 112 (in FIG. 3B) are in alignment with the through holes 530, 532, and 534 (shown in FIG. 4), of the indented tab areas 520, 522, and 524 (shown in FIG. 4) of the bottom flap 456 and bottom flap 470 (shown in FIG. 4). The corresponding slimline connectors of the riser board 114 are aligned with the apertures 464 and 466 in the rear frame 450. Screws 562 are provided to be inserted through the holes 530, 532, and 534 in the bottom flap 456 and bottom flap 470 (in FIG. 4), and through the corresponding holes in the riser board 114.

Figure 5D:
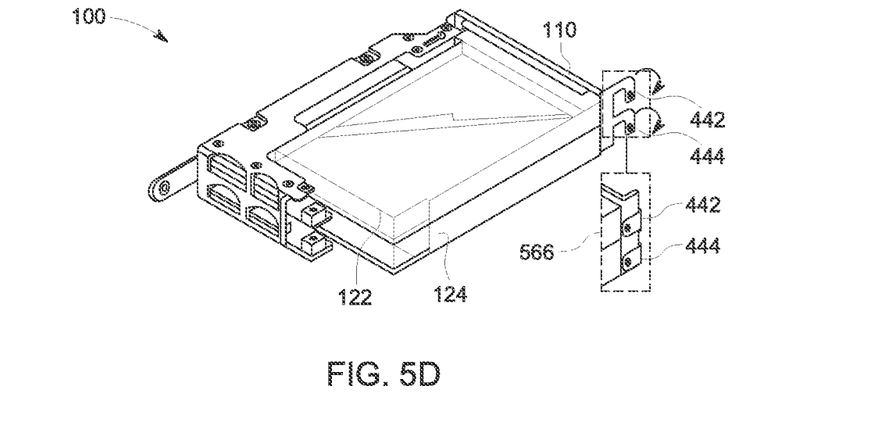

FIG. 5C shows the assembled riser boards 112 and 114 joined to the support bracket 110. The PCIe card 122 is moved so the connector edge 320 is inserted into the PCIe connector 220 of the riser board 112. Similarly, the PCIe card 124 is moved so the corresponding connector edge is inserted into the PCIe connector of the riser board 114. As shown in FIG. 5D, after the PCIe cards 122 and 124 are attached to the PCIe connectors of the riser boards 112 and 114, the latches 442 and 444 are rotated to the locked position to engage the respective PCIe cards 122 and 124 and lock them in place as shown in an inset 566.

Figure 5E:
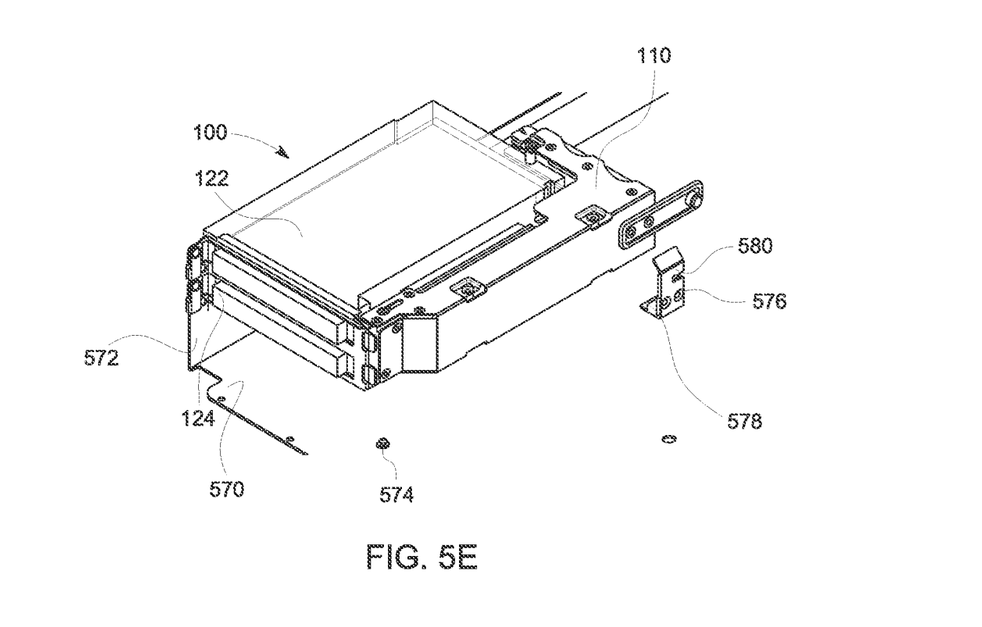

FIG. 5E is a view of the riser assembly 100 of the support bracket 110, riser boards 112 and 114, and PCIe cards 122 and 124 prior to installation on a motherboard 570 installed in a computing device compact chassis 572. The motherboard 570 has a pin 574 and a vertical bracket 576 that connect to the riser assembly 100. The vertical bracket 576 includes a tab 578 that is attached to the motherboard 570. The bracket 576 also includes a horizontal slot 580.

Figure 5F:
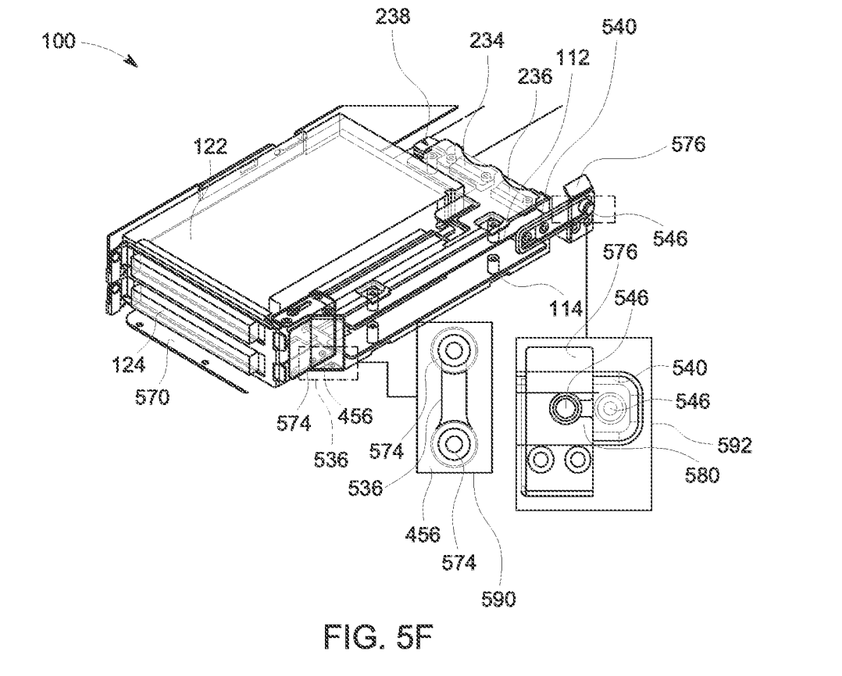

As shown in FIG. 5F, the riser assembly 100 (the assembled bracket 110, riser boards 112 and 114, and PCIe cards 122 and 124) is lowered to the motherboard 570. In this example, the aperture 536 on the bottom flap 456 of the bracket 110 (in FIG. 5E) is inserted around the pin 574 to align the support bracket 110 on the motherboard 570. An inset 590 is a top view showing the support bracket 110 moved forward from an initial position so the other end of the aperture 536 moves to contact the pin 574. Correspondingly, the autolock plunger 546 of the mounting bracket 540 is inserted in the slot 580 of the vertical bracket 576 attached to the motherboard 570, as shown in an inset 592. As the support bracket 110 is moved, as guided by the pin 574 in the aperture 536, the autolock plunger 546 moves to the closed end of the slot 580. Once at the closed end, the plunger of autolock plunger 546 may be pushed down to lock the bracket 540 to the vertical bracket 576.

The motherboard 570 includes groups of ribbon cables and connectors for electrical signals and power. The ribbon cables and connectors for electrical signals are plugged into the slimline connectors of the riser boards 112 and 114, such as the slimline connectors 234 and 236. Power cables and connectors are plugged into the power connectors of the riser boards 112 and 114, such as the power connector 238.

Figure 6:
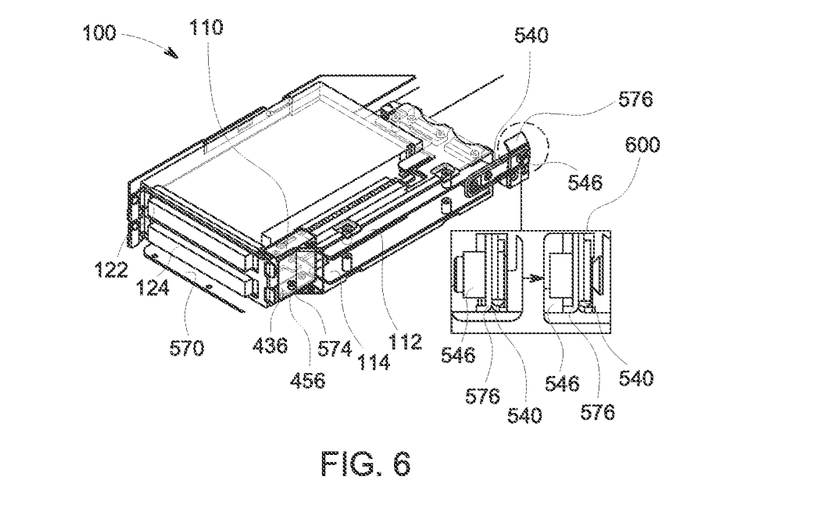
FIG. 6 shows the removal of the example expansion card riser assembly from a computing device chassis.

FIG. 6 shows the process of removing the riser assembly 100 with the inserted PCIe cards 122 and 124 from the motherboard 570. The various cables are unplugged from the slimline connectors and power connectors of the riser boards 112 and 114. In this example, the plunger of the autolock plunger 546 is moved from a locked position as shown in an inset 600 to an unlocked position. The bracket 540 may thus be detached from the vertical bracket 576. The assembly 100 may then be moved backward to move the aperture 536 relative to the pin 574. The aperture 574 of the bottom flap 456 may then be removed from the pin 574, and the assembly 100 may be lifted out of the motherboard 570.

Figure 7A:
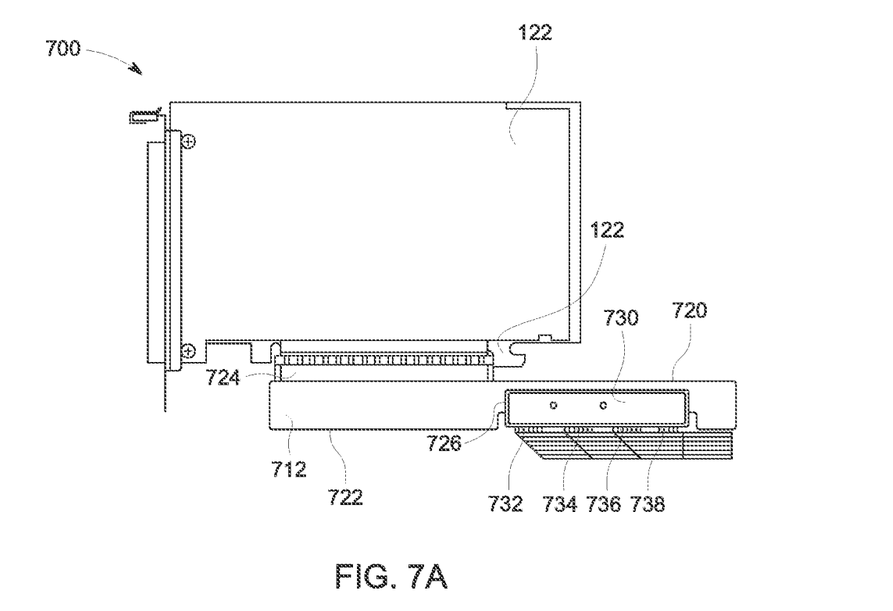
FIG. 7A is a top view of another example expansion card riser assembly using horizontal riser boards.
Figure 7B:
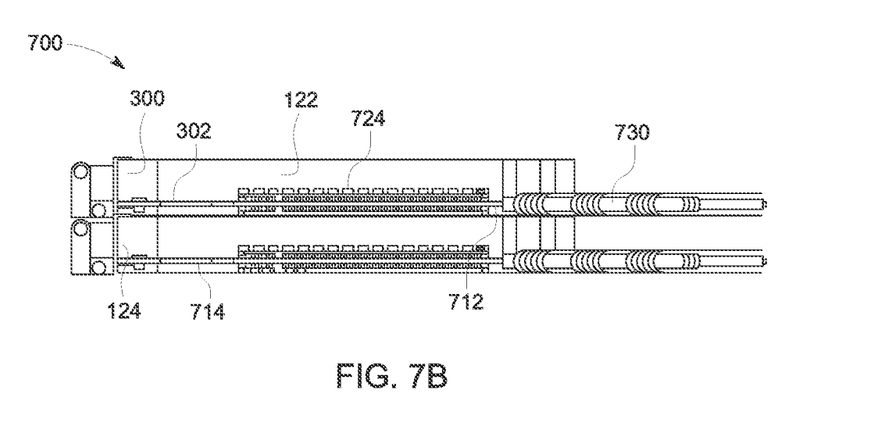
FIG. 7B is a side view of the example expansion card riser assembly in FIG. 7A.

FIG. 7A is a top view of another example riser assembly 700 that supports horizontal riser boards 712 and 714. FIG. 7B is a side view of the example riser assembly 700. In this example, the expansion cards 122 and 124 from FIGS. 1-4 may be supported by the horizontal riser boards 712 and 714 of the assembly 700, which may then be installed in a compact chassis such as the chassis 572 in FIG. 5E. The riser boards 712 and 714 are identical and thus reference will be made solely to the riser board 712. The riser board 712 includes two lengthwise opposite edges 720 and 722. The edge 720 includes a straddle mount type PCIe card connector 724. The straddle mount connector 724 accepts the connector edge of an expansion card such as the connector edge 320 of the card 122 (shown in FIGS. 3A-3B). The opposite edge 722 includes an indentation 726 that is defined on the part of the edge 722 opposite the portion of the edge 720 that does not hold the straddle mount connector 724. The indentation 726 provides an area to attach a card edge cable connector 730. The cable connector 730 has sockets for the insertion of the connectors with cable ribbons from the motherboard. In this example, the cable connector 730 has three groups of signal sockets 732, 734, and 736, and a power socket 738. The indentation 726 allows the card edge cable connector 730 to be recessed from the edge of the riser board, thereby minimizing the footprint of the riser board 712. The arrangement of the assembly 700 allows space savings in the overall width of the assembly 700.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A compact expansion card riser assembly for connection of a first expansion card and a second expansion card to a horizontally oriented circuit board comprising:
   a support bracket attachable to the circuit board;

a first horizontal riser board having an attachment portion and an external connector portion perpendicular to the attachment portion, the attachment portion having an expansion card connector operable to exchange data with a first horizontally oriented expansion card when the first expansion card is connected to the expansion card connector, the attachment portion bordering a first side of the first expansion card and wherein the external connector portion includes an external connector operable to exchange electrical signals with the circuit board, the external connector portion bordering a second side of the first expansion card perpendicular to the first side of the first expansion card, the first horizontal riser attached to the support bracket, wherein the support bracket and the first horizontal riser board are operable to support the first expansion card in a horizontal orientation; and a second horizontal riser board with an expansion card connector operable to exchange data with a second horizontally oriented expansion card when the second expansion card is connected to the expansion card connector, the second horizontal riser attached to the support bracket, wherein the support bracket and the second horizontal riser board are operable to support the second expansion card in a horizontal orientation.

2. The riser assembly of claim 1, wherein the expansion cards are PCIe cards.

3. The riser assembly of claim 1, wherein the second horizontal riser board includes an external connector for electrical connection to the circuit board.

4. The riser assembly of claim 3, wherein the second horizontal riser board includes an attachment portion mounting the expansion card connector and an external connection portion in perpendicular orientation to the attachment portion.

5. The riser assembly of claim 1, wherein the external connector is one of a slimline connector or a power connector mounted on an external edge of the external connection portion of the first horizontal riser board.

6. The riser assembly of claim 1, wherein the expansion card connectors are straddle mount connectors.

7. The riser assembly of claim 1, wherein the support bracket includes a bottom flap and a top flap.

8. The riser assembly of claim 7, wherein the top flap is attachable to the first riser board, and wherein the bottom flap is attachable to the second riser board.

9. The riser assembly of claim 8, wherein the bottom flap includes an aperture for mating with a pin on the circuit board, and a support bracket for attaching to a bracket on the circuit board.

10. The riser assembly of claim 1, wherein the support bracket includes a front frame with apertures to access expansion cards connected to the riser boards, and a rear frame with apertures to access the riser boards.

11. A compact expansion card riser assembly for connection of two expansion cards to a horizontally oriented circuit board comprising:

a support bracket attachable to the circuit board;

a first planar horizontal riser board having an inner edge with an expansion card connector and an opposite outer edge having a card edge cable connector operable to exchange electrical signals with the horizontally oriented circuit board, the card edge cable connector located in an indentation formed on the opposite outer edge, wherein the expansion card connector is operable to exchange data with a first horizontally oriented expansion card when the first expansion card is connected to the expansion card connector; and a second horizontal riser board with an expansion card connector operable to exchange data with a second horizontally oriented expansion card when the second expansion card is connected to the expansion card connector, the second horizontal riser attached to the support bracket, wherein the support bracket and the second horizontal riser board are operable to support the second horizontally oriented expansion card.

12. A computing system comprising:

a chassis;

a horizontally oriented circuit board installed on the chassis, the circuit board including cables for connection to PCIe expansion cards; and an expansion card riser assembly attached to the circuit board, the riser assembly including:

a support bracket;

a first horizontal riser board having an attachment portion and an external connector portion perpendicular to the attachment portion, the attachment portion having an expansion card connector having an attachment portion with an expansion card connector operable to exchange data with a first horizontally oriented PCIe expansion card when the first expansion card is connected to the expansion card connector, the attachment portion bordering a first side of the first expansion card and, wherein the external connector portion includes an external connector operable to exchange electrical signals with the circuit board via one of the cables, the external connector portion bordering a second side of the first expansion card perpendicular to the first side of the first expansion card, the first horizontal riser attached to the support bracket, wherein the support bracket and first horizontal riser board are operable to support the first PCIe expansion card in a horizontal orientation; and a second horizontal riser board with an expansion card connector operable to exchange data with a second horizontally oriented PCIe expansion card when the second expansion card is connected to the expansion card connector, the second horizontal riser attached to the support bracket, wherein the support bracket and the second horizontal riser board are operable to support the second horizontally oriented PCIe expansion card.

13. The computing system of claim 12, wherein the second horizontal riser board includes an external connector for electrical connection to the circuit board.

14. The computing system of claim 13, wherein the second horizontal riser board includes an attachment portion mounting the expansion card connector and an external connection portion in perpendicular orientation to the attachment portion.

15. The computing system of claim 12, wherein the external connector is mounted on an external edge of the external connection portion of the first horizontal riser board, wherein the external connector is one of a slimline connector and a power connector.

16. The computing system of claim 12, wherein the expansion card connectors are straddle mount connectors.

17. The computing system of claim 12, wherein the support bracket includes a bottom flap and a top flap, wherein the top flap is attachable to the first riser board, and wherein the bottom flap is attachable to the second riser board.

18. The computing system of claim 17, wherein the bottom flap includes an aperture for mating with a pin on the circuit board, and a support bracket for attaching to a bracket on the circuit board.

19. The computing system of claim 12, wherein the support bracket includes a front frame with apertures to access expansion cards connected to the riser boards, and a rear frame with apertures to access the riser boards.

\* \* \* \* \*